US009909939B2

United States Patent
Hou et al.

(10) Patent No.: US 9,909,939 B2
(45) Date of Patent: Mar. 6, 2018

(54) FORCE SENSING RESISTOR WITH EXTERNAL CONDUCTIVE LAYER

(71) Applicant: Adonit Co., Ltd., Taipei (TW)

(72) Inventors: Yu-Kuang Hou, Taipei (TW); Zachary Joseph Zeliff, Taipei (TW); Reinier Bloem, Taipei (TW); Michael A. Justice, Taipei (TW)

(73) Assignee: Adonit Co., Ltd., Taipei (TW)

( * ) Notice: Subject to any disclaimer, the term of this patent is extended or adjusted under 35 U.S.C. 154(b) by 0 days.

(21) Appl. No.: 15/176,045

(22) Filed: Jun. 7, 2016

(65) Prior Publication Data

US 2016/0356658 A1 Dec. 8, 2016

Related U.S. Application Data

(60) Provisional application No. 62/172,801, filed on Jun. 8, 2015.

(51) Int. Cl.
| | |
|---|---|
| *G01L 7/16* | (2006.01) |
| *G01L 1/20* | (2006.01) |
| *H01C 10/10* | (2006.01) |
| *H01C 1/142* | (2006.01) |
| *G01B 7/16* | (2006.01) |

(52) U.S. Cl.
CPC .............. *G01L 1/20* (2013.01); *H01C 1/142* (2013.01); *H01C 10/103* (2013.01)

(58) Field of Classification Search
CPC .......... H01C 10/103; H01C 1/142; G01L 1/20
USPC .................... 73/760, 862.632, 777
See application file for complete search history.

(56) References Cited

U.S. PATENT DOCUMENTS

| | | | |
|---|---|---|---|
| 3,710,050 A | 1/1973 | Richards | |
| 4,008,484 A * | 2/1977 | Maekawa | H01L 21/00 257/581 |
| 5,086,785 A | 2/1992 | Gentile et al. | |
| 5,727,977 A * | 3/1998 | Maracas | H01J 9/025 216/13 |
| 6,184,866 B1 | 2/2001 | Schrum et al. | |
| 6,496,178 B1 | 12/2002 | Schrum et al. | |
| 2002/0130412 A1* | 9/2002 | Nagai | H01L 23/3114 257/737 |
| 2003/0115966 A1* | 6/2003 | Ueno | A61B 5/1126 73/726 |
| 2004/0043190 A1* | 3/2004 | Kato | H01L 23/49805 428/137 |
| 2011/0273394 A1 | 11/2011 | Young et al. | |
| 2012/0253698 A1* | 10/2012 | Cokonaj | B06B 1/0622 702/39 |

(Continued)

FOREIGN PATENT DOCUMENTS

CN 102664082 A 9/2012

*Primary Examiner* — Max Noori

(57) ABSTRACT

Embodiments of a force sensing resistor (FSR) are disclosed. The FSR has one or more external conductive layers, applied to at least part of the contact surface of the FSR, so that when a conductive probe presses the FSR, initial zero-force contact with the FSR can be detected immediately. The external conductive layer or layers may be rigid sheet metal, flexible sheet metal, metallic-coated polymer, conductive polymer, conductive elastomer, or other conductive material. A lead or trace may be electrically coupled to the external conductive layer or layers to allow for ease of coupling to a circuit or circuit board.

21 Claims, 3 Drawing Sheets

(56) References Cited

U.S. PATENT DOCUMENTS

2013/0285970 A1* 10/2013 Ahn ................. G06F 3/044
                                                                                   345/173
2013/0340598 A1* 12/2013 Marquez ............ G10H 1/0558
                                                                                    84/730

\* cited by examiner

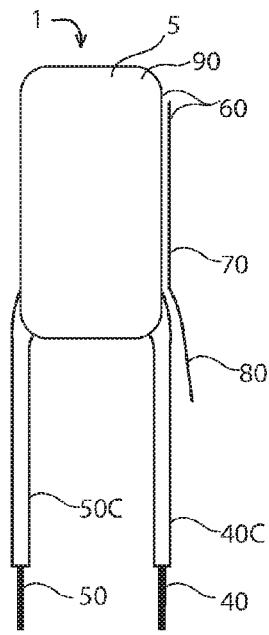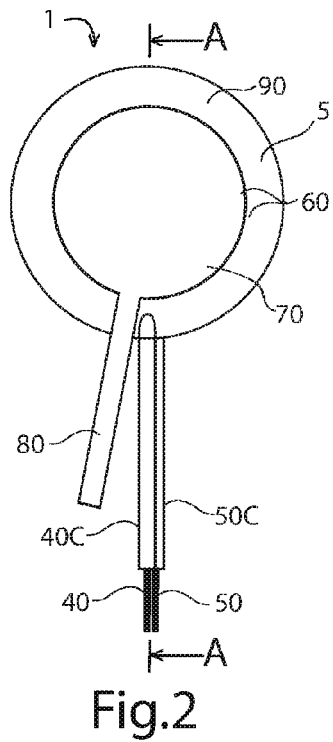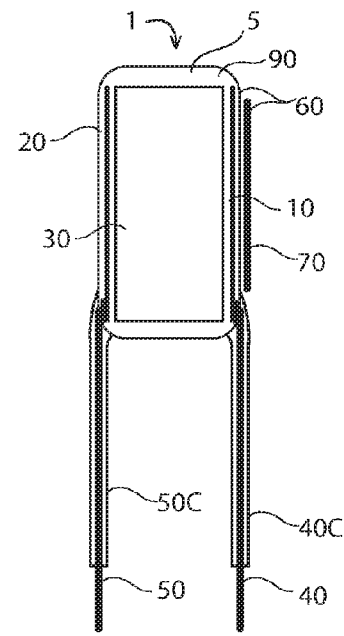
Fig.1　　　　Fig.2　　　　Fig.3
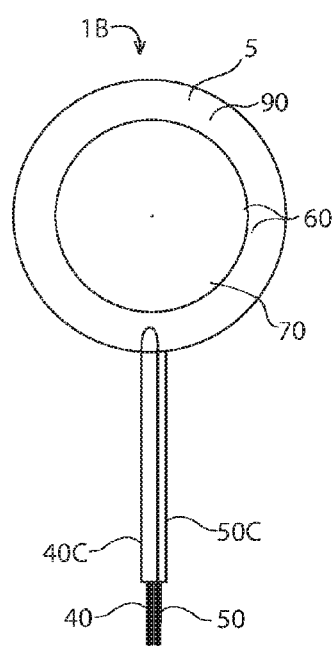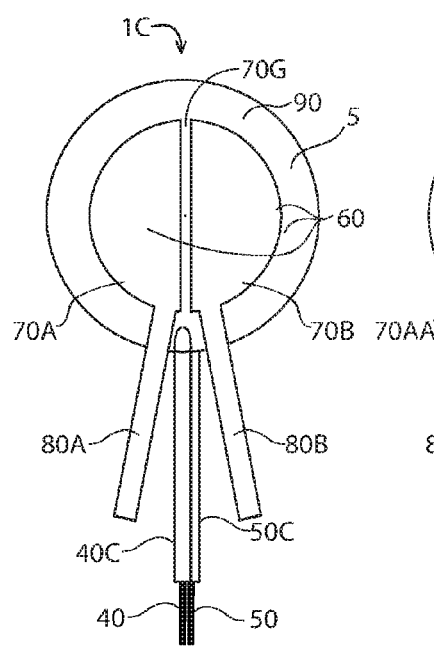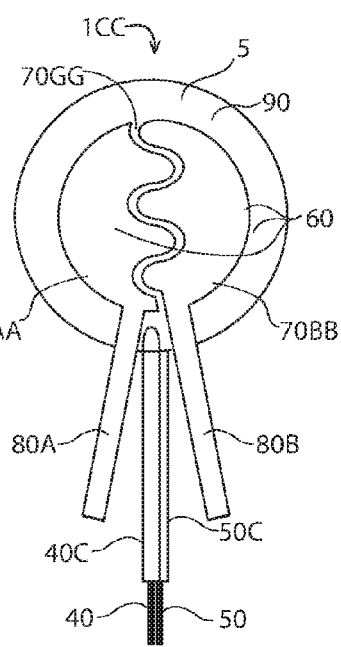
Fig.4　　　　Fig.5　　　　Fig.6

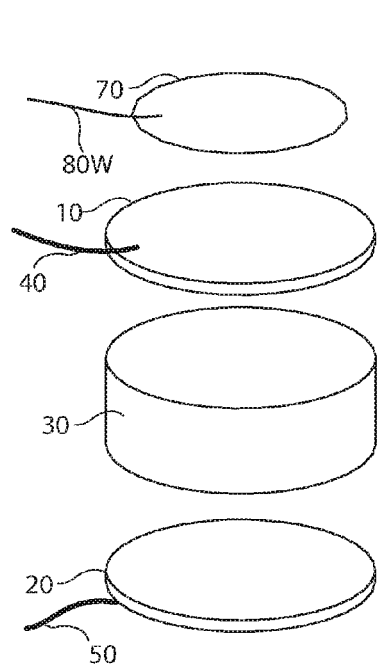
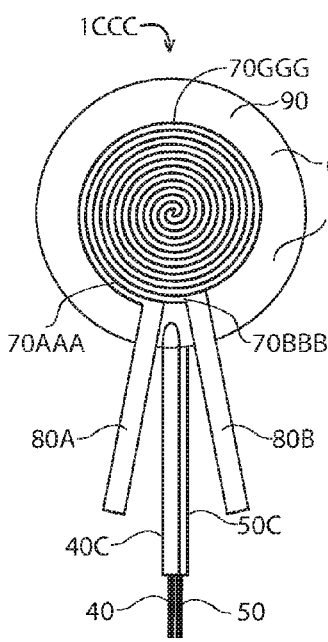
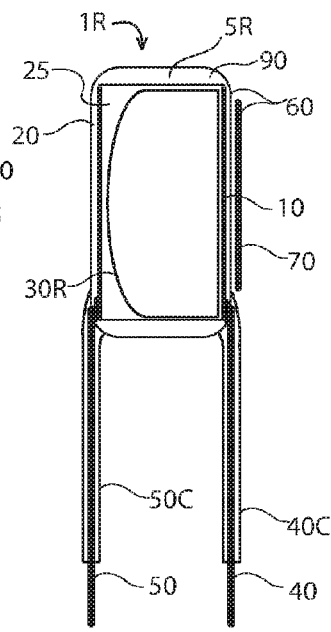
Fig.10    Fig.11    Fig.12
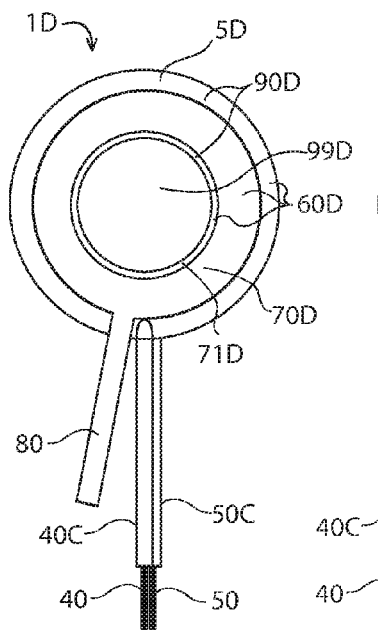
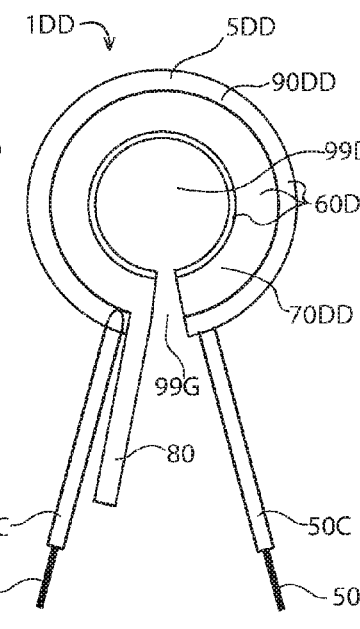
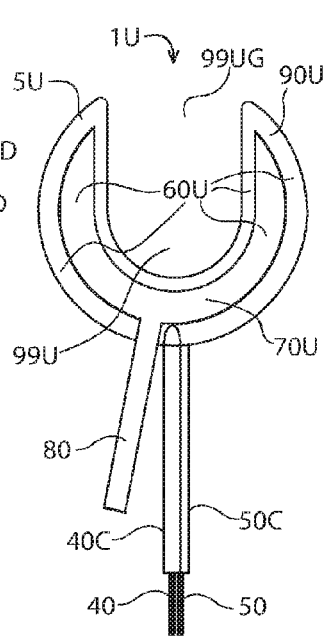
Fig.13    Fig.14    Fig.15

FORCE SENSING RESISTOR WITH EXTERNAL CONDUCTIVE LAYER

CROSS REFERENCE TO RELATED APPLICATIONS

This application claims the benefit of priority to U.S. provisional patent application No. 62/172,801, filed Jun. 8, 2015, entitled "FORCE SENSING RESISTOR WITH EXTERNAL CONDUCTIVE LAYER", which is hereby incorporated by reference in its entirety for all purposes.

FIELD OF THE DISCLOSURE

This disclosure relates to force sensing resistors, and more particularly to force sensing resistors having a conductive surface or surfaces for detecting initial or near-zero-force contact.

SUMMARY OF THE PRIOR ART

The force sensing resistor (FSR) is well known in the art. A FSR generally comprises a flexible material, such as a polymer or elastomer, optionally foamed, with conductive particles mixed into the flexible material to make a flexible conductive material. The flexible conductive material is placed between two electrodes. Lead wires are electrically coupled to the electrodes, and the FSR (the electrodes and flexible conductive material, as well as initial portions of the lead wires) is encapsulated in a nonconductive flexible material to avoid contamination, damage, electrical shorting, and the like.

Force may be applied to the FSR against a surface adjacent to one or both electrodes; some FSRs may have force applied against only one such surface, while others may be reversible such that force may be applied to either of the electrode-adjacent surfaces; the one or more such surfaces are the contact surface or contact surfaces. The electrode under the contact surface, or both electrodes, may be rigid so that force is applied across the entire area of the flexible conductive material. A FSR is typically mounted in a housing such that it is held immobile relative to a movable probe; the probe may optionally be constrained such that it can move only in a direction normal to the surface of the FSR. When no force is applied to the FSR, some conductive particles are in contact with each other, bridging the two electrodes, resulting in a given resistance value. When force is applied to a contact surface of the FSR, the force or pressure compresses the flexible conductive material; the flexible conductive material deforms under the force, causing more conductive particles to touch each other and causing the electrodes to move closer together, thereby decreasing resistance between the electrodes in an approximately predictable manner: higher force increases conductivity, lower force increases resistance. In some FSRs, the flexible conductive material also has an air gap between itself, shaped in a form that prevents it from contacting an electrode, and force applied to the contact surface causes the flexible conductive material to deform and close the air gap, with the electrode shape allowing predictable increase in conductivity as pressure increases.

Other construction methods for making FSRs are known, such as using a mound of flexible conductive material to bridge between a first electrode and a second electrode. When no force is applied, the flexible conductive material does not contact the second electrode. As pressure is applied to the flexible conductive material, the flexible conductive material compresses against the second electrode, allowing current to flow. As more pressure is applied to the flexible conductive material, the flexible conductive material contacts the second electrode over more of the second electrode's surface area, reducing resistance in a predictable manner.

Disadvantages of force sensing resistors include that their force vs. resistance change is nonlinear, the change in force vs. resistance is not consistent from press to press even for the same FSR, no initial change in resistance necessarily happens at very low levels of force, and that no change in resistance occurs when contact is first made but no force is yet applied (zero force contact or initial contact). As a result, initial contact is difficult to detect.

Improvements in force sensing resistors are therefore desirable.

SUMMARY OF CERTAIN ASPECTS OF THE EMBODIMENTS

Embodiments are disclosed that add one or more external conductive layers to the contact surface of a force sensing resistor (FSR) to provide an initial touch zero-force indication. Optionally, each of the one or more external conductive layers may have a lead or trace electrically coupled to it. Some embodiments may be shaped to allow passage of other components through the FSR.

BRIEF DESCRIPTION OF THE DRAWINGS

FIG. 1 shows a side view of a force sensing resistor with a conductive surface layer;

FIG. 2 shows a force sensing resistor with a conductive surface layer;

FIG. 3 shows a cross sectional view of the internals of a force sensing resistor with a conductive surface layer along the line A-A of FIG. 2;

FIG. 4 shows a front view of an alternate embodiment of the contact side of a force sensing resistor with a conductive surface layer lacking a trace;

FIG. 5 shows a front view of an alternate embodiment of the contact side of a force sensing resistor with a plurality of conductive surfaces each having a lead;

FIG. 6 shows a front view of an alternate embodiment of the contact side of a force sensing resistor with a plurality of conductive surfaces each having a lead;

FIG. 10 shows an expanded view of some internals of the embodiment of FIGS. 1-3;

FIG. 11 shows a front view of an alternate embodiment of the contact side of a force sensing resistor with a plurality of conductive surfaces each having a lead;

FIG. 12 shows a cross sectional view of an alternative embodiment of the internals of a force sensing resistor with a conductive surface layer along the line A-A of FIG. 2;

FIG. 13 shows a front view of an embodiment of a force sensing resistor with a conductive surface and a central hole;

FIG. 14 shows a front view of an embodiment of a force sensing resistor with a conductive surface and a central hole;

FIG. 15 shows a front view of an embodiment of a force sensing resistor with a conductive surface and central hole.

DETAILED DESCRIPTION OF THE EMBODIMENTS

Figure 7:
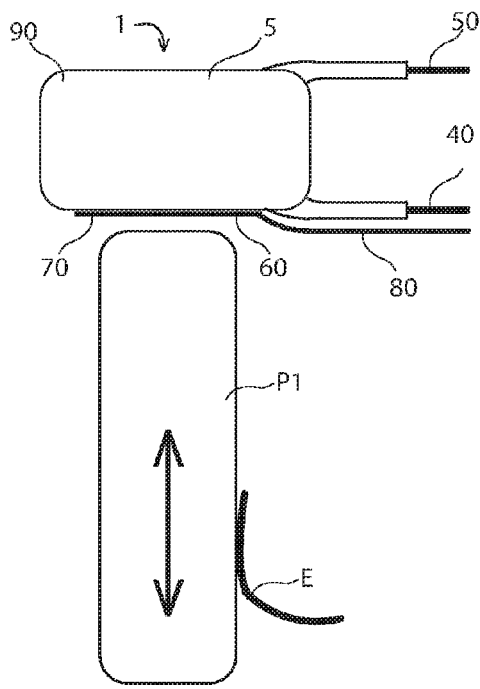
FIG. 7 shows the embodiment of FIGS. 1-3 in a possible usage scenario.

The following detailed description of embodiments references the accompanying drawings that form a part hereof, and in which are shown by way of illustration various illustrative embodiments through which the invention may be practiced. The embodiments are described in sufficient detail to enable those skilled in the art to practice the invention, and it is to be understood that other embodiments may be utilized and that logical changes may be made without departing from the spirit and scope of the invention. The detailed description is, therefore, not to be taken in a limiting sense, and the scope of the invention is defined solely by the appended claims.

As used herein, the words "trace", "pin", "lead", and "lead wire" may be used interchangeably to indicate a wire or pad electrically coupled or electrically connected to a portion of an electronic/electrical component. The wire or pad is usually metallic, and conducts electricity from inside the component to a circuit that the component is a part of, e.g., by soldering the lead to a pad on a printed circuit board.

Please refer to FIG. 1 and FIG. 2, a side and plan view respectively of an embodiment of a force sensing resistor (FSR) having a conductive layer on its contact face. The FSR 1 has a body 5 comprising a nonconductive coating 90 and the materials encapsulated within the nonconductive coating 90, and a first lead 40 and second lead 50 that are electrically coupled to electrodes enclosed inside the nonconductive coating 90. First lead 40 and second lead 50 may optionally be enclosed in insulation 40C and insulation 50C respectively. An external conductive layer 70 having a lead 80 is applied to or formed on a contact surface 60 of the FSR 1. The external conductive layer may for example without limitation be metallic, such as a metal foil or sheet metal, or a metal coating on a substrate, such as a flexible PCB (metal coating on polyimide or another polymer), or a conductive polymer, or a conductive elastomer. The lead 80 may be integrally formed with the external conductive layer 70 or may be a separate lead that is electrically coupled to external conductive layer 70, for example but not limited to being coupled by welding, soldering, brazing, staking or contact.

FIG. 3 shows a cross-section of the FSR of FIG. 1 and FIG. 2 along the line A-A of FIG. 2. The flexible conductive material 30 is sandwiched between first electrode 10 and second electrode 20. Nonconductive coating 90 surrounds them. The external conductive layer 70 is formed on the contact surface 60 of the nonconductive coating 90. Lead 40 is electrically coupled to first electrode 10 and lead 50 is electrically coupled to second electrode 20, for example by welding, brazing, soldering, staking, or contact.

FIG. 12 shows a cross section of an alternate type of FSR in the form factor of the FSR of FIG. 1, taken along the line A-A of the FSR of FIG. 1 and FIG. 2. The FSR 1R with body 5R has flexible conductive material 30R shaped in such a way that the area of its contact patch against the second electrode 20 varies with pressure. A gap 25 between the flexible conductive material 30R and all or part of the second electrode 20 exists when no force is applied to the contact surface 60. Pressure against the contact surface 60 forces the flexible conductive material 30R into increasing contact with the second electrode 20 as the flexible conductive material 30R deforms, thus increasing conductivity. External conductive surface 70 is unaffected by the internals of an FSR and may be applied to any design of FSR.

FIG. 10 shows an expanded view of the electrical components of an embodiment of a FSR; the nonconductive coating is not shown in this view. First electrode 10 may be electrically coupled to lead 40 by staking, soldering, brazing, and/or welding, and/or other methods known in the art; in some embodiments, first electrode 10 may also or instead be monolithically formed with an integral lead 40. Second electrode 20 may be electrically coupled to lead 50 by staking, soldering, brazing, and/or welding, and/or other methods known the art; in some embodiments, second electrode 20 may also or instead be monolithically formed with an integral lead 50. Flexible conductive material 30 is positioned between first electrode 10 and second electrode 20 such that each face is in contact with one electrode. An alternate embodiment of the external conductive layer 70 with a lead wire 80W is shown. External conductive layer 70 may be electrically coupled to lead wire 80W by staking, soldering, brazing, and/or welding, and/or other methods known in the art.

FIG. 4 shows a plan view of a second embodiment of a FSR having a conductive surface. The external conductive layer 70 of FSR 1B has no lead extending from it.

FIG. 5 shows a plan view of a third embodiment of a FSR having a plurality of conductive surfaces. The FSR 1C has a plurality of external conductive layers 70A, 70B, each having a separate lead 80A, 80B respectively. There is a gap 70G between the plurality of external conductive layers 70A, 70B to prevent electrical conductance between the plurality of conductive layers unless and until the gap 70G is bridged by contact with a conductor.

FIG. 6 shows a plan view of a variation of a third embodiment of an FSR having a plurality of external conductive layers. FSR 1CC has a plurality of external conductive layers 70AA, 70BB. The gap 70GG between the external conductive layers is a wavy path. When in use, the wavy path of gap 70GG reduces the risk that a conductor pressing against the contact surface 60 of the FSR 1CC will fail to bridge the gap to allow conductance among the plurality of conductive layers.

FIG. 11 shows a plan view of another variation of a third embodiment of an FSR having a plurality of external conductive layers. The FSR 1CCC has a plurality of external conductive layers 70AAA, 70BBB arranged as approximately spiral paths having the same center point and 360/N degrees out of phase; i.e., for N=2, the spirals are 180 degrees apart; for three spirals, the spirals are 120 degrees apart, and so on. The gap 70GGG (shown in the figure as the black line between the two spirals) between the external conductive layers is likewise a double spiral. When in use, the spiral path of gap 70GGG reduces the risk that a conductor pressing against the contact surface 60 of the FSR 1CCC will fail to bridge the gap to allow conductance among the plurality of conductive layers; any contact patch of diameter larger than the width of a single conductive spiral path plus the gap width will contact both spirals, while smaller contact patches are still likely to contact both. For example without limitation, the external conductive layers 70AAA, 70BBB may be formed on and from a single flexible PCB such as copper-coated polyimide; the leads 80A, 80B may optionally also be formed on the same flexible PCB. The external conductive layers 70AAA, 70BBB and leads 80A, 80B may also be formed of metal foil, sheet metal, metal wire, molded conductive polymer or conductive elastomer, and so on.

FIG. 13 shows a front view of a FSR having an external conductive layer. The FSR 1D has an annular body 5D, having a hole 99D through the body 5D of the FSR 1D. Nonconductive coating 90D conforms to the annular shape of the body 5D. The external conductive layer 70D likewise has a through hole 71D that is at least as large as hole 99D. Contact surface 60D is likewise annular.

FIG. 14 shows a front view of a FSR having an external conductive layer. The FSR 1DD has an approximately annular body 5DD with a gap 99G leading to the central hole 99DD. Nonconductive coating 90DD conforms to the annular shape of the body 5DD. The body 5DD may be flexible to assist with ease of assembly. The gap 99G permits assembly of the FSR 1DD around a fixed probe, and/or may be used to accommodate a wire, ridge, or other protrusion along the side of a probe. The leads 40, 50 may in some embodiments be arranged on opposite sides of the gap 99G. Contact surface 60DD and external conductive layer 70DD are likewise gapped.

FIG. 15 shows a front view of a FSR having an external conductive layer. The FSR 1U has a gapped annular body 5U with a gap 99UG having the width of the diameter of the central hole 99U. Nonconductive coating 90U conforms to the U-shape of the body 5U. The body 5U of the FSR 1U does not need to be flexible in order to accommodate assembly around a probe. Contact surface 60U and external conductive layer 70U are likewise U-shaped to conform to the shape of the body 5U.

Other embodiments of shapes to accommodate intruding mechanical or electronic parts may be readily created for FSRs having one or more external conductive layers.

FIG. 7, FIG. 8, FIG. 9, and FIG. 16 show four embodiments of the FSR with conductive layer in possible use scenarios.

FIG. 7 shows the embodiment of FIGS. 1, 2, 3, 10 in use. The FSR 1 is held in a housing (not shown) such that the FSR 1 is held immobile relative to a probe P1, while the probe P1 is slidably disposed in the housing and probe P1 is constrained to move approximately normal to the contact surface 60 of FSR 1, such that a proximal end of probe P1 can contact FSR 1 and apply varying amounts of force to FSR 1. The probe P1 may be made of a conductive material, for example a metal, or have a conductive coating, for example a metal plating. Leads 40, 50, 80 and electrical contact E are electrically coupled to a circuit (not shown). As the probe P1 contacts contact surface 60 of FSR 1, electrical conductivity is completed from electrical contact E through the probe P1 to external conductive layer 70 on the contact surface 60 of FSR 1 and so to lead wire 80; the circuit thus completed can be used to detect initial contact between the probe P1 and the FSR 1. The probe P1 may be biased away from the FSR 1 by an elastic member such as a spring (not shown), to urge the probe P1 away from contact with the FSR 1 when no force is applied to the distal end of the probe P1. By minimizing the distance between probe P1 and the contact surface 60 of FSR 1, and by using an elastic member minimally sufficient to urge the probe P1 away from FSR 1, even light contact that is unable to cause a detectable change in resistance of the FSR 1 will nevertheless cause probe P1 to move into contact with the contact surface 60 of FSR 1, thus completing the electrical path and allowing the initial contact to be detected by the circuit (not shown). Additional force is detectable through changes in the resistance of FSR 1 across the leads 40, 50 through the electrodes 10, 20 and the flexible conductive material 30. Nonconductive coating 90 contains and protects the internal components.

Figure 8:
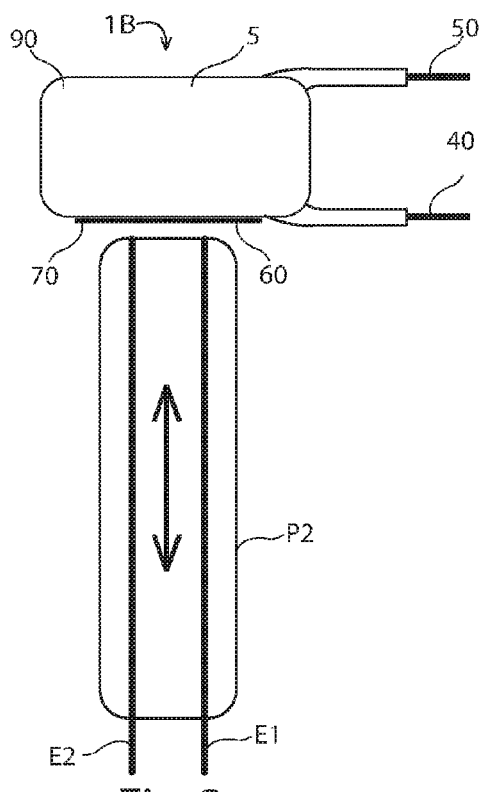
FIG. 8 shows the embodiment of FIG. 4 in a possible usage scenario.

FIG. 8 shows the embodiment of FIG. 4 in use. The FSR 1B is held in a housing (not shown) such that the FSR 1B is held immobile relative to a probe P2, while the probe P2 is slidably disposed in the housing and probe P2 is constrained to move approximately normal to the contact surface 60 of FSR 1B, such that a proximal end of probe P2 can contact FSR 1B and apply varying amounts of force to FSR 1B. The probe P2 for use with this embodiment may be nonconductive; instead of the probe P2 being used to conduct electricity to the contact surface 60 of the FSR, probe P2 has electrical contacts E1, E2 running through it to its face. Leads 40, 50 and electrical contacts E1, E2 are electrically coupled to a circuit (not shown). As the probe P2 contacts contact surface 60 of FSR 1B, electrical conductivity is completed from electrical contact E1 through the probe P2 to external conductive layer 70 on the contact surface 60 of FSR 1B and so to electrical contact E2; the circuit thus completed can be used to detect initial contact between the probe P2 and the FSR 1E. This embodiment may simplify circuit construction in some circuit designs, as it keeps the electrical contacts E1, E2 used for detecting initial contact together and keeps them separate from the leads 40, 50 used to detect changes in resistance of the FSR 1. It should be noted that the embodiment of the FSR 1 of FIGS. 1, 2, 3, 10 can be used in the identical manner, as lead wire 80 can simply be left unconnected, or can be connected to a circuit to provide two electrical paths for detecting initial contact.

Figure 9:
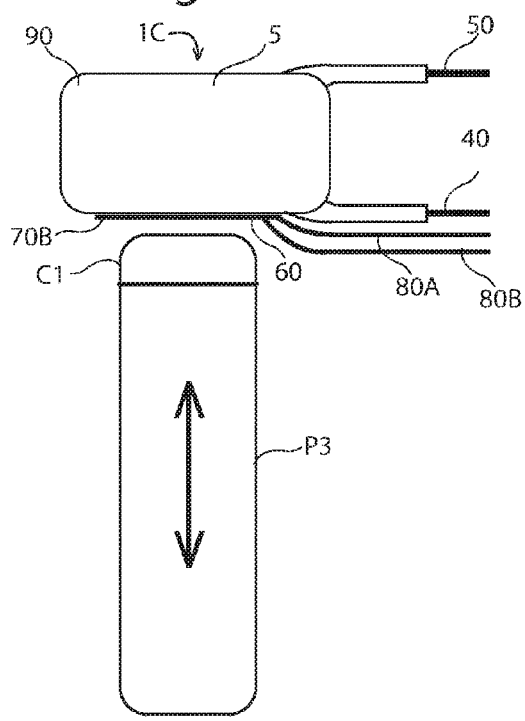
FIG. 9 shows the embodiments of FIG. 5 and/or FIG. 6 and/or FIG. 11 in a possible usage scenario.

FIG. 9 shows the embodiment of FIG. 5 in use. The FSR 1C is held in a housing (not shown) such that the FSR 1C is held immobile relative to a probe P3, while the probe P3 is slidably disposed in the housing and probe P3 is constrained to move approximately normal to the contact surface 60 of FSR 1C, such that a proximal end C1 of probe P3 can contact FSR 1C and apply varying amounts of force to FSR 1C. The proximal end C1 of probe P3 may be made of a conductive material, for example a metal or a conductive polymer or conductive elastomer, or have a conductive coating, for example a metal plating or ITO layer. Leads 40, 50, 80A, 80B are electrically coupled to a circuit (not shown). As the probe P3 contacts contact surface 60 of FSR 1C, electrical conductivity is completed from lead wire 80A through external conductive layer 70A (on this drawing, external conductive layer 70A is "behind" external conductive layer 70B and so is not shown; please see FIG. 5 and FIG. 6 respectively for the layout) through conductive proximal end C1 of probe P3 to external conductive layer 70B and so to lead wire 80B; the circuit thus completed can be used to detect initial contact between the probe P3 and the FSR 1C. This embodiment may simplify circuit construction in some applications since no electrical leads need to move with the probe P3; instead, all electrical leads are located on the FSR 1C. FSR 1CC of FIG. 6 may be substituted for FSR 1C and functions in the same way; the twisted gap 70GG with many oxbows helps to ensure that regardless of any obliqueness in contact between the probe P3 and the plurality of external conductive layers 70AA, 70BB, contact will be made by the conductive proximal end C1 among all of the plurality of external conductive layers 70AA, 70BB thus helping to ensure detection of initial contact. Likewise, FSR 1CCC of FIG. 11 may be substituted for FSR 1C and functions in the same way; the twin spiral external conductive layers 70AAA, 70BBB help to ensure that detection of initial contact is reliably made.

Figure 16:
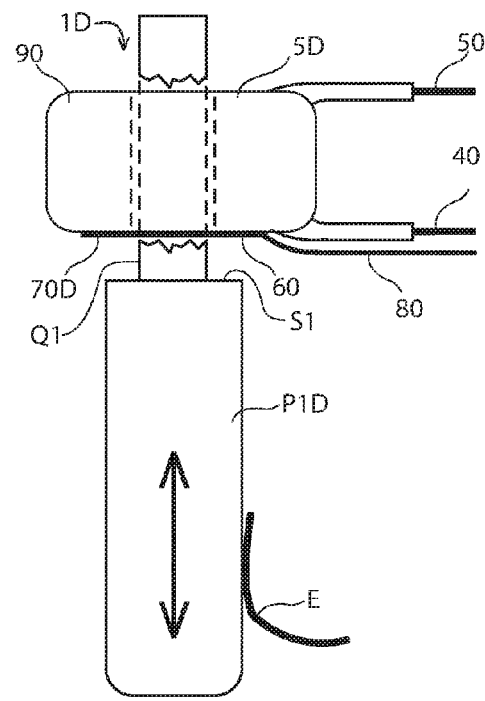
FIG. 16 shows the embodiment of FIG. 13 in a possible usage scenario.

FIG. 16 shows the embodiment of FIG. 13 in use; the embodiments of FIG. 14 or FIG. 15 may also be used in the same way. The probe P1D has a step S1 and narrower section Q1 (shown with broken ends to indicate a cutaway)

extending from the proximal end of probe P1D. The narrower section Q1 of probe P1D goes through hole 99D. When force is applied to distal end of probe P1D, step S1 first contacts contact surface 60D and external conductive layer 70D, allowing current to flow from electrical contact E through probe P1D and external conductive layer 70D to lead 80. Additional force applied to the distal end of probe P1D compresses FSR 1D. The embodiments of FIG. 14 and FIG. 15 may also be used with this type of probe; the embodiment of FIG. 14 has a slot through one side of the FSR 1DD to simplify assembly in situations where the probe P1D must be assembled into a small enclosure before FSR 1DD is installed, but requires that the FSR 1DD including the external conductive layer 70DD be flexible; the embodiment of FIG. 15 has a wide gap, creating a U-shaped FSR 1U, allowing assembly around a through-probe even if the FSR 1U cannot be flexed around the probe P1D.

We claim as our invention:

1. A force sensing resistor comprising:
   an external conductive layer disposed upon a contact surface of the force sensing resistor, and
   a second external conductive layer disposed upon the contact surface of the force sensing resistor, where the second external conductive layer is electrically isolated from the external conductive layer, where:
   the external conductive layer and second external conductive layer are spirals, each coiled around respective center points thereof, where the center point of the external conductive layer and the center point of the second external conductive layer are the same center point.

2. The force sensing resistor of claim 1, where the external conductive layer is a sheet metal layer.

3. The force sensing resistor of claim 1, where the external conductive layer is a metal-coated polymer layer.

4. The force sensing resistor of claim 1, where the external conductive layer is a flexible conductive material.

5. The force sensing resistor of claim 4, where the flexible conductive material is a conductive polymer.

6. The force sensing resistor of claim 4, where the flexible conductive material is a conductive elastomer.

7. A force sensing resistor comprising:
   a first electrode,
   a flexible conductive material,
   a second electrode,
   a first conductive lead,
   a second conductive lead,
   a nonconductive encapsulation, and
   an external conductive layer, where:
   the flexible conductive material is sandwiched between the first electrode and the second electrode, the first conductive lead is electrically coupled to the first electrode, the second conductive lead is electrically coupled to the second electrode, the nonconductive encapsulation surrounds the flexible conductive material and the first electrode and the second electrode, the external conductive layer is applied to at least a portion of the nonconductive encapsulation.

8. The force sensing resistor of claim 7 where the flexible conductive material is shaped to change an area of contact between the flexible conductive material and the second electrode as force against a contact surface changes.

9. The force sensing resistor of claim 7 further comprising a third conductive lead, where the third conductive lead is electrically coupled to the external conductive layer.

10. The force sensing resistor of claim 7, where the external conductive layer is a sheet metal layer.

11. The force sensing resistor of claim 7, where the external conductive layer is a metal-coated polymer layer.

12. The force sensing resistor of claim 7, where the external conductive layer is a flexible conductive material.

13. The force sensing resistor of claim 12, where the flexible conductive material is a conductive polymer.

14. The force sensing resistor of claim 12, where the flexible conductive material is a conductive elastomer.

15. A force sensing resistor comprising a plurality of external conductive layers disposed upon a contact surface of the force sensing resistor, the plurality of external conductive layers being mutually insulated from each other, where the plurality of external conductive layers form a plurality of spirals, each coiled around respective center points thereof, where the center points of the plurality of external conductive layers are the same center points.

16. The force sensing resistor of claim 15 further comprising a plurality of leads, each lead of the plurality of leads electrically coupled to one external conductive layer of the plurality of external conductive layers.

17. The force sensing resistor of claim 15, where at least one of the plurality of external conductive layers is a sheet metal layer.

18. The force sensing resistor of claim 15, where at least one of the plurality of external conductive layers is a metal-coated polymer layer.

19. The force sensing resistor of claim 15, where at least one of the plurality of external conductive layers is a flexible conductive material.

20. The force sensing resistor of claim 19, where the flexible conductive material is a conductive polymer.

21. The force sensing resistor of claim 19, where the flexible conductive material is a conductive elastomer.

* * * * *